US010526957B2

(12) United States Patent
Aoyagi et al.

(10) Patent No.: US 10,526,957 B2
(45) Date of Patent: Jan. 7, 2020

(54) CONTROL DEVICE FOR INTERNAL COMBUSTION ENGINE INCLUDING TURBOCHARGER

(71) Applicant: TOYOTA JIDOSHA KABUSHIKI KAISHA, Toyota-shi, Aichi-ken (JP)

(72) Inventors: Shinsuke Aoyagi, Isehara (JP); Junichi Murase, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 80 days.

(21) Appl. No.: 15/954,076

(22) Filed: Apr. 16, 2018

(65) Prior Publication Data
US 2018/0328269 A1 Nov. 15, 2018

(30) Foreign Application Priority Data
May 10, 2017 (JP) .................... 2017-093927

(51) Int. Cl.
*F02D 41/00* (2006.01)
*F02D 41/20* (2006.01)
*F02B 37/18* (2006.01)

(52) U.S. Cl.
CPC .......... *F02B 37/183* (2013.01); *F02B 37/186* (2013.01); *F02D 41/0007* (2013.01); *F02D 41/20* (2013.01); *F02D 2200/0406* (2013.01)

(58) Field of Classification Search
CPC ................. F02D 41/0007; F02D 41/20; F02D 2200/0406; F02B 37/18; F02B 37/183; F02B 37/186
See application file for complete search history.

(56) References Cited

U.S. PATENT DOCUMENTS

| 2006/0213194 A1 | 9/2006 | Hasegawa |
| 2014/0102092 A1* | 4/2014 | Karnik ................. F02B 37/186 60/602 |
| 2015/0337718 A1 | 11/2015 | Saeki |

FOREIGN PATENT DOCUMENTS

| EP | 2439393 A1 * | 4/2012 | ......... F02D 41/0007 |
| EP | 3078830 A2 | 10/2016 | |
| JP | H06-272565 A | 9/1994 | |
| JP | H08-074588 A | 3/1996 | |
| JP | 2006-274831 A | 10/2006 | |
| JP | 2015-059490 A | 3/2015 | |
| JP | 5888422 B2 | 3/2016 | |
| JP | 2016-200027 A | 12/2016 | |

* cited by examiner

*Primary Examiner* — Audrey K Bradley
(74) *Attorney, Agent, or Firm* — Hunton Andrews Kurth LLP (57) ABSTRACT

A control device for an internal combustion engine including a turbocharger and a negative-pressure waste gate valve includes an electronic control unit configured i) to apply a first drive current value to a pressure regulation valve so as to maintain an opening degree of the waste gate valve in a fully closed state in a case where an actual boost pressure is lower than a target boost pressure and a boost pressure difference between the actual boost pressure and the target boost pressure is equal to or larger than a threshold, and ii) to apply a second drive current value that is smaller than the first drive current value to the pressure regulation valve in a case where the actual boost pressure is lower than the target boost pressure and the boost pressure difference is smaller than the threshold.

2 Claims, 5 Drawing Sheets

CONTROL DEVICE FOR INTERNAL COMBUSTION ENGINE INCLUDING TURBOCHARGER

INCORPORATION BY REFERENCE

The disclosure of Japanese Patent Application No. 2017-093927 filed on May 10, 2017 including the specification, drawings and abstract is incorporated herein by reference in its entirety.

BACKGROUND

1. Technical Field

The disclosure relates to a control device for an internal combustion engine including a turbocharger.

2. Description of Related Art

A control device for an internal combustion engine including a turbocharger and a waste gate valve (WGV) is disclosed in Japanese Patent Application Publication No. 2016-200027 (JP 2016-200027 A). The turbocharger includes a turbine that is driven by exhaust gas flowing through an exhaust pipe; and a compressor that is connected to the turbine and compresses air flowing through an intake pipe. The WGV is provided in a bypass pipe that bypasses the turbine in the exhaust pipe. When an opening degree of the WGV is changed, a pressure of the air flowing through a portion of the intake pipe downstream of the compressor (hereinafter also referred to as a "boost pressure") is changed.

The control device controls the opening degree of the WGV such that the boost pressure matches a target boost pressure. The control device determines whether an actual boost pressure is equal to or higher than the target boost pressure in the case where the opening degree of the WGV is in a fully closed state. When a determination result is positive, the control device changes the opening degree of the WGV toward an opened state from the fully closed state (that is, the control device changes the opening degree of the WGV such that the WGV is opened from the fully closed state). By executing this opening degree control of the WGV, it is possible to avoid an overshoot of the boost pressure.

SUMMARY

A pressure-regulated WGV has been available. An opening degree of the pressure-regulated WGV is changed by regulating the pressure. The pressure-regulated WGVs are roughly divided into a positive-pressure WGV and a negative-pressure WGV based on a difference in a pressure source. In a state where a positive pressure from the pressure source does not act on the positive-pressure WGV, the opening degree of the positive-pressure WGV is in the fully closed state (i.e., the opening degree of the positive-pressure WGV is a value at which the positive-pressure WGV is regarded as being in the fully closed state). In a state where a negative pressure from the pressure source does not act on the negative-pressure WGV, the opening degree of the negative-pressure WGV is in a fully opened state (i.e., the opening degree of the negative-pressure WGV is a value at which the negative-pressure WGV is regarded as being in the fully opened state). When the positive pressure acts on the positive-pressure WGV, the opening degree of the positive-pressure WGV is changed toward the fully opened state from the fully closed state (i.e., the opening degree of the positive-pressure WGV is changed such that the positive-pressure WGV is opened from the fully closed state). When the negative pressure acts on the negative-pressure WGV, the opening degree of the negative-pressure WGV is changed toward the fully closed state from the fully opened state (i.e., the opening degree of the negative-pressure WGV is changed such that the negative-pressure WGV is closed from the fully opened state).

The opening degree of the WGV is influenced by an exhaust pressure difference between positions upstream and downstream of the WGV and a flow rate of the exhaust gas flowing upstream of the WGV. Accordingly, in the case where the negative-pressure WGV is used and the actual boost pressure is lower than the target boost pressure, in order to maintain the opening degree of the negative-pressure WGV in the fully closed state, the negative pressure having a significantly large absolute value needs to act on the negative-pressure WGV. When the negative pressure having the large absolute value acts on the negative-pressure WGV, the above-described positive determination result is obtained (i.e., it is determined that the actual boost pressure is equal to or higher than the target boost pressure) due to an increase in the actual boost pressure. When the positive determination result is obtained, in order to change the opening degree of the negative-pressure WGV to open the negative-pressure WGV from the fully closed state, it is necessary to significantly decrease the absolute value of the negative pressure that acted on the negative-pressure WGV before the above-described positive determination is obtained. This may delay the change of the actual boost pressure toward the target boost pressure.

The disclosure makes it possible to maintain an opening degree of a negative-pressure waste gate valve in a fully closed state at a time when an actual boost pressure is lower than a target boost pressure, and to ensure supercharging responsiveness at a time when the actual boost pressure is increased to be equal to or higher than the target boost pressure in a case where the boost pressure is controlled by controlling the opening degree of the negative-pressure waste gate valve.

An aspect of the disclosure relates to a control device for an internal combustion engine including a turbocharger and a waste gate valve. The turbocharger includes a turbine driven by exhaust gas flowing through an exhaust pipe of the internal combustion engine, and a compressor connected to the turbine and configured to compress air flowing through an intake pipe of the internal combustion engine. The waste gate valve is a negative-pressure waste gate valve provided in a bypass pipe that bypasses the turbine in the exhaust pipe. The waste gate valve is configured such that an opening degree of the waste gate valve is changed toward a fully closed state from a fully opened state when a pressure regulation valve regulates a negative pressure. The control device includes an electronic control unit. The electronic control unit is configured i) to apply a first drive current value to the pressure regulation valve so as to maintain the opening degree of the waste gate valve in the fully closed state in a case where an actual boost pressure that is an actual pressure of the air flowing through a portion of the intake pipe downstream of the compressor is lower than a target boost pressure and a boost pressure difference between the actual boost pressure and the target boost pressure is equal to or larger than a threshold, and ii) to apply a second drive current value that is smaller than the first drive current value to the pressure regulation valve in a case where the actual boost pressure is lower than the target boost pressure and the boost pressure difference is smaller than the threshold.

The first drive current value is applied to the pressure regulation valve in the case where the actual boost pressure is lower than the target boost pressure and the boost pressure difference is equal to or larger than the threshold. Thus, the opening degree of the waste gate valve is maintained in the fully closed state. The second drive current value is applied to the pressure regulation valve in the case where the actual boost pressure is lower than the target boost pressure and the boost pressure difference is smaller than the threshold. Thus, a degree of the change in the negative pressure becomes relatively small when the actual boost pressure is increased to be equal to or higher than the target boost pressure in the near future.

The second drive current value may maintain the opening degree of the waste gate valve in the fully closed state in which the opening degree of the waste gate valve is as close to an intermediate opening degree as possible.

Since the second drive current value maintains the opening degree of the waste gate valve in the fully closed state in which the opening degree of the waste gate valve is as close to the intermediate opening degree as possible, the degree of the change in the negative pressure is minimized when the actual boost pressure is increased to be equal to or higher than the target boost pressure in the near future.

According to the above aspect of the disclosure, it is possible to maintain the opening degree of the waste gate valve in the fully closed state at the time when the actual boost pressure is lower than the target boost pressure, and to ensure supercharging responsiveness at the time when the actual boost pressure is increased to be equal to or higher than the target boost pressure.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A description will hereinafter be made on an embodiment of the disclosure on the basis of the drawings. Note that common elements in the drawings will be denoted by the same reference numerals and a description thereof will not be repeated. The disclosure is not limited to the following embodiment.

Figure 1:
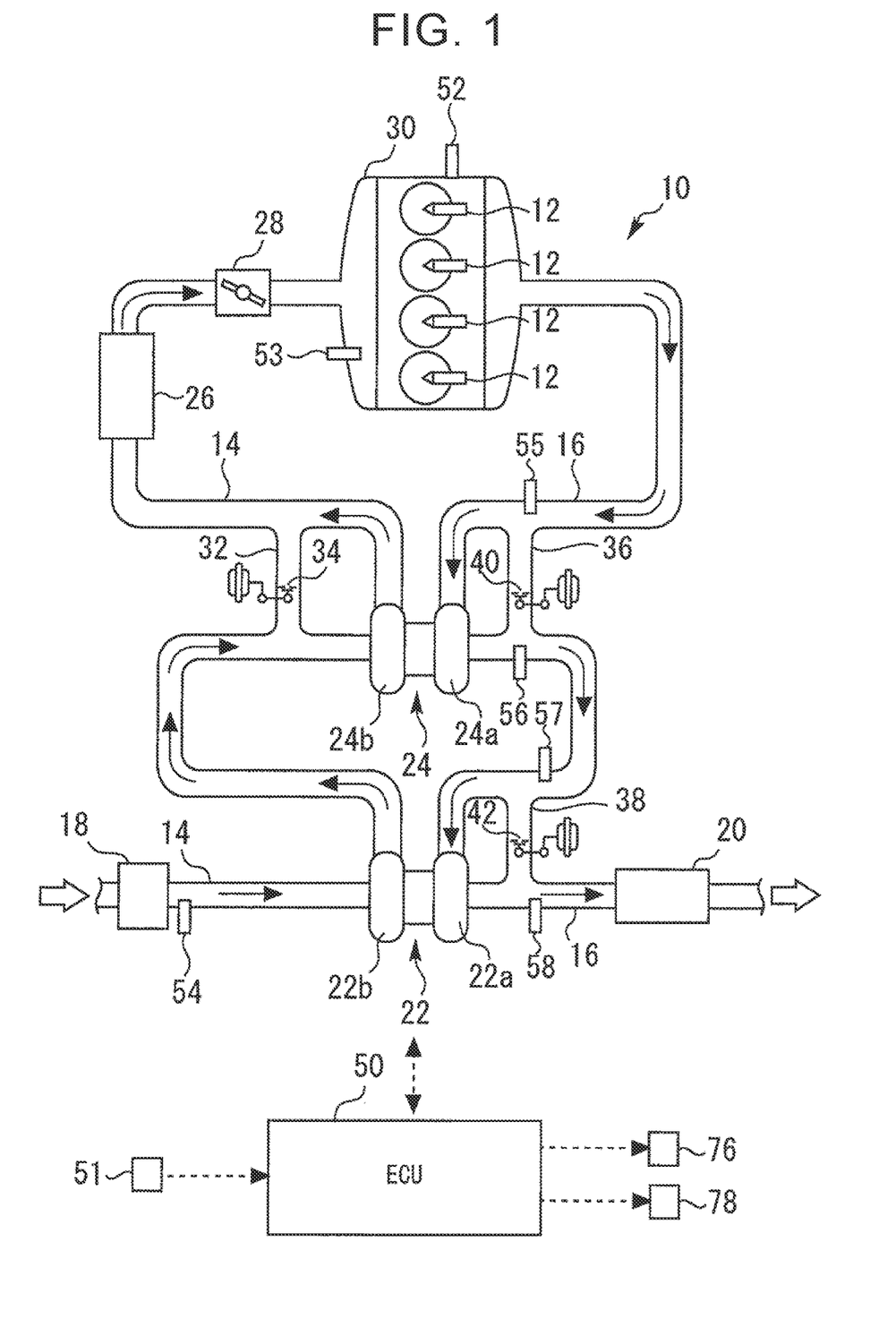
FIG. 1 is a view illustrating a system configuration example in an embodiment of the disclosure.

FIG. 1 is a view illustrating a system configuration example in the embodiment of the disclosure. A system shown in FIG. 1 is a system mounted on a vehicle and includes a diesel engine (hereinafter also simply referred to as an "engine") 10 as a power source. The engine 10 is an inline four-cylinder engine. However, the number of cylinders and arrangement of the cylinders of the engine 10 are not limited to the above-described number and arrangement. The engine 10 includes an injector 12 that injects fuel for each cylinder. An intake pipe 14 is connected to an intake side of the engine 10. An air cleaner 18 is provided near an inlet of the intake pipe 14. An exhaust pipe 16 is connected to an exhaust side of the engine 10. An aftertreatment device 20 configured to clean exhaust gas is provided in an intermediate portion of the exhaust pipe 16.

The system shown in FIG. 1 is configured as a series twin-turbo system in which two turbochargers are disposed in series. More specifically, the engine 10 includes a low-pressure stage turbocharger 22 and a high-pressure stage turbocharger 24. The turbocharger 22 includes a turbine 22a that is actuated by using exhaust energy; and a compressor 22b that is integrally connected to the turbine 22a. The compressor 22b is rotationally driven by using the exhaust energy that is input to the turbine 22a. Similarly to the turbocharger 22, the turbocharger 24 includes a turbine 24a and a compressor 24b. The turbocharger 22 and the turbocharger 24 have the same basic configuration. However, the turbocharger 24 is configured as a relatively smaller turbocharger than the turbocharger 22.

The turbines 22a, 24a are each provided in an intermediate portion of the exhaust pipe 16. The turbine 22a is provided downstream of the turbine 24a in the exhaust pipe 16. The compressors 22b, 24b are provided in the intake pipe 14. The compressor 22b is provided upstream of the compressor 24b in the intake pipe 14. An intercooler 26 is provided downstream of the compressor 24b in the intake pipe 14. A diesel throttle 28 is provided downstream of the intercooler 26. The air that is suctioned into the intake pipe 14 through the air cleaner 18 is compressed by the compressor 22b and the compressor 24b. The air that has been compressed by the compressor 22b and the compressor 24b is cooled by the intercooler 26. The air that has been cooled by the intercooler 26 is distributed to each of the cylinders in the engine 10 through an intake manifold 30.

An end of an intake bypass pipe 32 is connected to an intermediate portion of the intake pipe 14 between the compressor 24b and the intercooler 26. The other end of the intake bypass pipe 32 is connected to an intermediate portion of the intake pipe 14 between the compressor 22b and the compressor 24b. An air bypass valve (ABV) 34 that controls a flow rate of the air flowing through the intake bypass pipe 32 is provided in an intermediate portion of the intake bypass pipe 32. The ABV 34 includes a positive-pressure diaphragm actuator. When an opening degree of the ABV 34 is regulated to open the intake bypass pipe 32, the air that has been compressed by the compressor 22b bypasses the compressor 24b and is supplied to the engine 10.

The system shown in FIG. 1 includes an exhaust bypass pipe 36 that bypasses the turbine 24a in the exhaust pipe 1; and an exhaust bypass pipe 38 that bypasses the turbine 22a in the exhaust pipe 16. A waste gate valve (WGV) 40 that controls a flow rate of the exhaust gas flowing through the exhaust bypass pipe 36 is provided in an intermediate portion of the exhaust bypass pipe 36. Similarly to the exhaust bypass pipe 36, a WGV 42 is provided in an intermediate portion of the exhaust bypass pipe 38. The WGVs 40, 42 each include a negative-pressure diaphragm actuator. When opening degrees of the WGVs 40, 42 are regulated, a pressure of the air that flows through a portion of the intake pipe 14 downstream of the compressor 24b is changed. Here, the "a portion downstream of the compressor 24b" means a portion immediately downstream of the intercooler 26, a portion immediately upstream of the diesel throttle 28, or the intake manifold 30. Hereinafter, the "pressure of the air that flows through a portion of the intake pipe 14 downstream of the compressor 24b" will be collectively referred to as a "boost pressure".

The system shown in FIG. 1 includes an electronic control unit (ECU) 50 as a control device. The ECU 50 includes a central processing unit (CPU), random access memory (RAM), read only memory (ROM), an input interface, an output interface, a bidirectional bus, and the like. To the input interface of the ECU 50, an accelerator operation amount sensor 51, a crank angle sensor 52, a boost pressure sensor 53, an airflow meter 54, exhaust pressure sensors 55, 56, 57, 58, and the like are connected. To the output interface of the ECU 50, the injectors 12, the diesel throttle 28, the ABV 34, the WGVs 40, 42, an electric pump 76, a vacuum regulation valve (VRV) 78, and the like are connected. The VRV 78 may be regarded as a pressure regulation valve.

The accelerator operation amount sensor 51 outputs a signal that corresponds to a depression amount of an accelerator pedal. The crank angle sensor 52 outputs a signal that corresponds to a rotation angle of a crankshaft. The boost pressure sensor 53 outputs a signal that corresponds to an actual boost pressure. The airflow meter 54 outputs a signal that corresponds to the flow rate of the air suctioned into the engine 10. The exhaust pressure sensor 55 outputs a signal that corresponds to a pressure of the exhaust gas flowing through a portion of the exhaust pipe 16 upstream of the WGV 40 (hereinafter also referred to as an "engine speed (engine rotational speed) Ne"). The exhaust pressure sensor 56 outputs a signal that corresponds to the engine speed Ne, i.e., a pressure of the exhaust gas downstream of the WGV 40. The exhaust pressure sensor 57 outputs a signal that corresponds to the engine speed Ne, i.e., a pressure of the exhaust gas upstream of the WGV 42. The exhaust pressure sensor 58 outputs a signal that corresponds to the engine speed Ne, i.e., a pressure of the exhaust gas downstream of the WGV 42.

Figure 2:
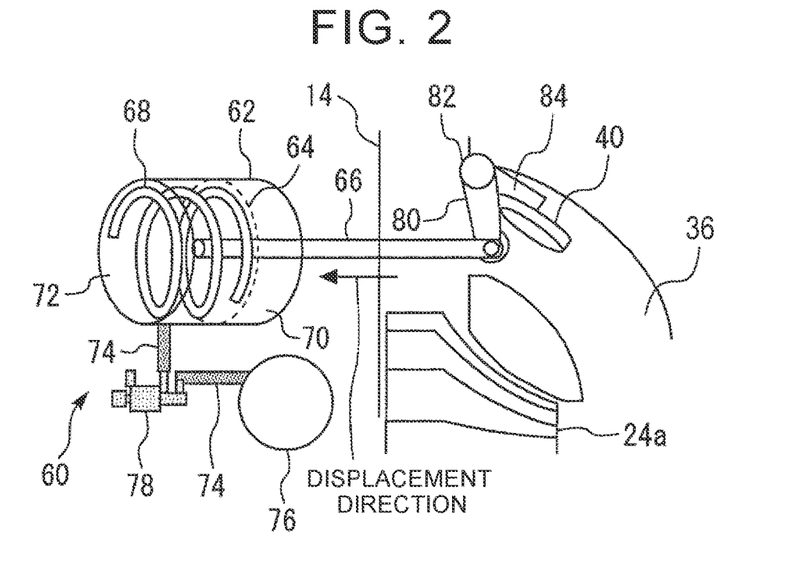
FIG. 2 is a view illustrating a configuration example of WGVs shown in FIG. 1.

FIG. 2 is a view illustrating a configuration example of the WGVs 40, 42 shown in FIG. 1. Note that, because the WGV 40 and the WGV 42 have the same basic configuration, FIG. 2 illustrates only the configuration example of the WGV 40 as a representative example. As shown in FIG. 2, the WGV 40 opens and closes one end of the exhaust bypass pipe 36. The WGV 40 includes a diaphragm actuator 60. The actuator 60 includes a housing 62, a diaphragm 64, a rod 66, and a coil spring 68. The diaphragm 64 is formed of a flexible material such as rubber or a resin. An outer periphery of the diaphragm 64 is fixed to an inner periphery of the housing 62. An internal space of the housing 62 is partitioned into a high-pressure chamber 70 and a low-pressure chamber 72 by the diaphragm 64. The high-pressure chamber 70 is maintained at the atmospheric pressure.

The housing 62 is provided with a pressure pipe 74 that communicates with the low-pressure chamber 72. The pressure pipe 74 is connected to the electric pump 76 as a pressure source configured to generate a specified negative pressure. The vacuum regulation valve (VRV) 78 is provided in an intermediate portion of the pressure pipe 74, and the VRV 78 regulates the negative pressure that is supplied to the actuator 60 from the electric pump 76. The VRV 78 is constructed of a solenoid valve, for example. Based on a drive current value $I_D$ that is applied to the VRV 78 from the ECU 50, the VRV 78 releases some or all of the negative pressure, which is generated by the electric pump 76, to the atmosphere. In this way, the negative pressure that acts on the low-pressure chamber 72 is regulated (adjusted) between a value near the atmospheric pressure and the specified negative pressure (maximum negative pressure) generated by the electric pump 76.

The WGV 40 shown in FIG. 2 also includes a drive arm 80. The drive arm 80 is connected to the rod 66 and is fixed to a rotational shaft 82. A link 84 is also fixed to the rotational shaft 82. The WGV 40 and the link 84 integrally rotate about the rotational shaft 82. When the rod 66 is displaced in an arrow direction (a displacement direction) shown in FIG. 2, the WGV 40 moves to a closed position (i.e., the WGV 40 is brought to a closed state). When the rod 66 is displaced in a direction opposite to the arrow direction, the WGV 40 moves to an opened position (i.e., the WGV 40 is brought to an opened state). When the negative pressure from the electric pump 76 does not act on the low-pressure chamber 72, the opening degree of the WGV 40 is in a fully opened state. As the absolute value of the negative pressure that acts on the low-pressure chamber 72 is increased, the opening degree of the WGV 40 is decreased. Then, when the absolute value of the negative pressure that acts on the low-pressure chamber 72 is equal to or larger than a given value, the opening degree of the WGV 40 is in the fully closed state. In the disclosure, the phrase "the opening degree of the WGV is in the fully opened state" signifies that the opening degree of the WGV is a value at which the WGV is regarded as being in the fully opened state, and the phrase "the opening degree of the WGV is in the fully closed state" signifies that the opening degree of the WGV is a value at which the WGV is regarded as being in the fully closed state.

In this embodiment, the ECU 50 executes boost pressure feedback control (hereinafter also referred to as "F/B control"). In the F/B control, in order to cause the actual boost pressure to follow a target boost pressure, an opening degree of the VRV 78 is regulated so as to control the opening degree of the WGV 40 or the WGV 42. When the F/B control is executed, the ECU 50 first sets the target boost pressure on the basis of an operation state of the engine 10. The target boost pressure is determined on the basis of a target boost pressure map that has the engine speed Ne and a fuel injection amount Q as parameters. The engine speed Ne is computed on the basis of the output signal of the crank angle sensor 52. The fuel injection amount Q is computed on the basis of the output signal of the accelerator operation amount sensor 51.

In parallel with setting of the target boost pressure, the ECU 50 selects the turbocharger 22 or the turbocharger 24 as a turbocharge to be driven. The turbocharger to be driven is selected on the basis of a driven-turbocharger map that has the engine speed Ne and the fuel injection amount Q as parameters. For example, in the case where the operation state of the engine 10 falls within a low-speed operation range, the ECU 50 selects the turbocharger 24 as the turbocharger to be driven. In this case, the ECU 50 brings the opening degree of the WGV 42 into the fully opened state and regulates the opening degree of the WGV 40. In the case where the operation state of the engine 10 falls within a high-speed operation range, the ECU 50 selects the turbocharger 22 as the turbocharger to be driven. In this case, the ECU 50 brings the opening degree of the WGV 40 into the fully opened state and regulates the opening degree of the WGV 42.

Figure 3:
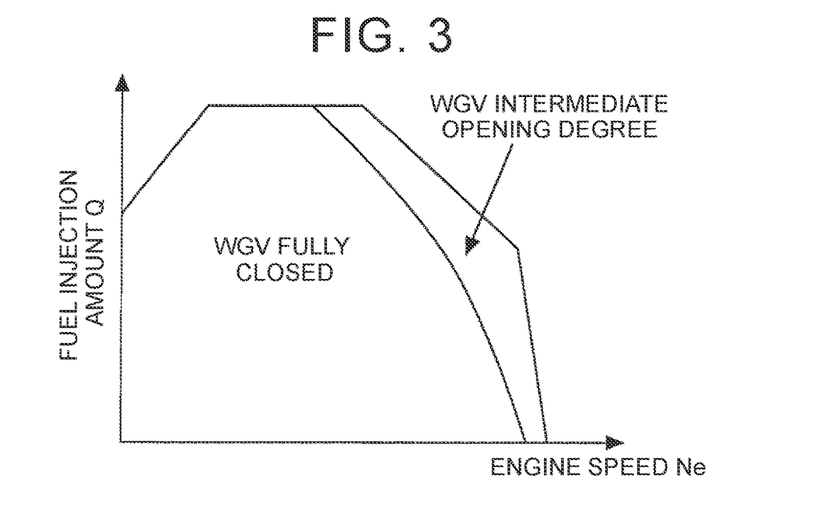
FIG. 3 is a graph illustrating an example of a base opening degree map for the WGV.

In order to regulate the opening degree of the WGV that corresponds to the turbocharger to be driven (hereinafter also referred to as the "driven WGV"), the ECU 50 determines a base opening degree of the driven WGV. The base opening degree is computed as a base drive current value $I_{DBASE}$ using the engine speed Ne and the fuel injection amount Q as parameters. The base drive current value $I_{DBASE}$ is a base value of a current that is applied to a drive circuit of the VRV 78. A base opening degree map for the WGV 40 and a base opening degree map for the WGV 42 are separately provided. FIG. 3 is a graph illustrating an example of the base opening degree map for the WGV 42. As shown in FIG. 3, the base drive current value $I_{DBASE}$ is set such that the opening degree of the WGV is maintained in the fully closed state in a large part (a significant part) of the engine operation range and the opening degree of the WGV becomes an intermediate opening degree in a part at the high-speed side. Note that the intermediate opening degree means the opening degree between the fully closed state and the fully opened state.

After the base opening degree (the base drive current value $I_{DBASE}$) of the driven WGV is determined, the ECU 50 computes a final opening degree of the driven WGV on the basis of the base opening degree and a feedback correction amount. The feedback correction amount is a total value of a difference between the actual boost pressure and the target boost pressure, an integral thereof, and a differential thereof, for example. The actual boost pressure is computed on the basis of the output signal of the boost pressure sensor 53. The target boost pressure is determined on the basis of the target boost pressure map. The final opening degree of the driven WGV is computed as a sum of the base opening degree and the feedback correction amount.

Figure 4:
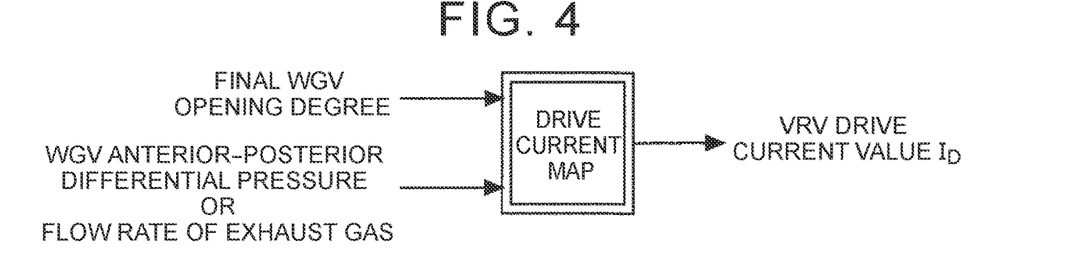
FIG. 4 is a diagram illustrating an input/output relationship in a drive current map.

After computing the final opening degree of the driven WGV, the ECU 50 computes the drive current value $I_D$ that is applied to the drive circuit of the VRV 78 provided in the driven WGV. The drive current value $I_D$ is computed on the basis of a drive current map that has the final opening degree of the driven WGV and an exhaust pressure difference between positions upstream and downstream of the driven WGV (hereinafter also referred to as a "WGV anterior-posterior differential pressure") as parameters. FIG. 4 is a diagram illustrating an input/output relationship in the drive current map. The WGV anterior-posterior differential pressure shown in FIG. 4 is computed on the basis of the output signals of the exhaust pressure sensors 55, 56 or the output signals of the exhaust pressure sensors 57, 58. As shown in FIG. 4, instead of the WGV anterior-posterior differential pressure, a flow rate of the exhaust gas that flows upstream of the driven WGV may be used as the input parameter for the drive current map. This is because the flow rate of the exhaust gas is highly correlated with the WGV anterior-posterior differential pressure.

The drive current value $I_D$ is converted to a control pulse signal in a DUTY generating circuit by using a specified conversion factor. The control pulse signal is applied to a solenoid coil of the VRV 78 provided in the driven WGV.

As it has already been described, the opening degree of the WGV is influenced by the exhaust pressure difference between positions upstream and downstream of the WGV and the flow rate of the exhaust gas flowing upstream of the WGV. That is, the opening degree of the driven WGV is influenced by the WGV anterior-posterior differential pressure and the flow rate of the exhaust gas flowing upstream of the driven WGV. In this embodiment, in the case where the actual boost pressure is lower than the target boost pressure, the base drive current value $I_{DBASE}$ is set to a maximum value $I_{D\_FCmax}$ so as to maintain the opening degree of the driven WGV in the fully closed state irrespective of the above-described influence. When the maximum value $I_{D\_FCmax}$ is set to a large value, the opening degree of the driven WGV can be reliably maintained in the fully closed state. When the actual boost pressure is increased to be equal to or higher than the target boost pressure, the base drive current value $I_{DBASE}$ may be computed such that the opening degree of the driven WGV is changed toward the opened state (i.e., the opening degree of the driven WGV is changed so as to open the driven WGV). In this case, when the maximum value $I_{D\_FCmax}$ is set to the large value, it takes time for the negative pressure acting on the low-pressure chamber 72 to increase to reach a desired value (in other words, it takes time for the absolute value of the negative pressure to decrease to reach the desired value). This may delay the change of the actual boost pressure toward the target boost pressure.

In view of the above, in this embodiment, the base opening degree map to be used is switched on the basis of a pressure difference between the target boost pressure and the actual boost pressure (hereinafter also referred to as a "boost pressure difference"). More specifically, in the case where the boost pressure difference is equal to or larger than a threshold, the base opening degree map illustrated in FIG. 3 is used. In the case where the boost pressure difference is smaller than the threshold and the actual boost pressure is lower than the target boost pressure, a base opening degree map that differs from the base opening degree map illustrated in FIG. 3 is used. Hereinafter, for convenience of the description, the base opening degree map illustrated in FIG. 3 will be referred to as a "first base opening degree map", and the other base opening degree map will be referred to as a "second base opening degree map". In consideration of supercharging responsiveness required for the engine 10, the threshold of the boost pressure difference can be set to a value that is approximately 1 to 10% of the target boost pressure, for example.

Figure 5:
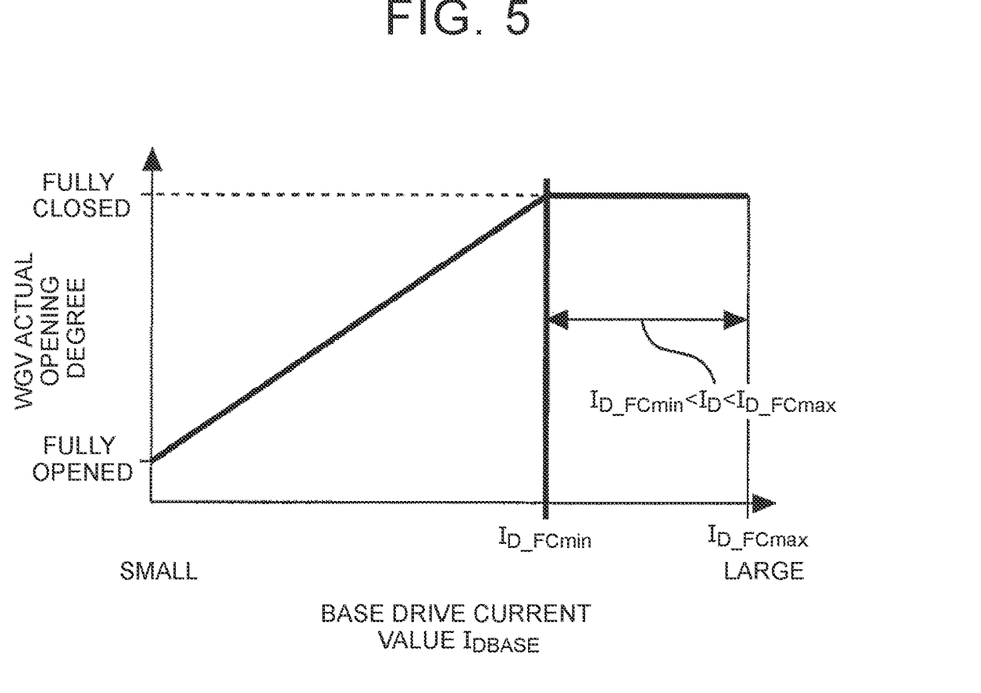
FIG. 5 is a graph illustrating a relational example between a base drive current value and an actual opening degree of the WGV.

FIG. 5 is a graph illustrating a relational example between the base drive current value $I_{DBASE}$ and the actual opening degree of the WGV. FIG. 5 is created by changing the base drive current value $I_{DBASE}$ under a condition that the WGV anterior-posterior differential pressure is maintained to be constant and plotting the actual opening degree of the WGV with respect to the base drive current value $I_{DBASE}$. As shown in FIG. 5, in the case where the base drive current value $I_{DBASE}$ is equal to or larger than a minimum value $I_{D\_FCmin}$, the actual opening degree of the WGV can be brought into the fully closed state in which the actual opening degree of the WGV is as close to the intermediate opening degree as possible (in other words, the WGV can be brought into the fully closed state while the actual opening degree of the WGV is made as close to the intermediate opening degree as possible).

The first base opening degree map and the second base opening degree map differ from each other in data of the base drive current value $I_{DBASE}$ in the operation range (see the "WGV FULLY CLOSED" range in FIG. 3) where the opening degree of the WGV is maintained in the fully closed state. That is, in the first base opening degree map, all the data of the base drive current value $I_{DBASE}$ within this operation range corresponds to the above-described maximum value $I_{D\_FCmax}$. In the second base opening degree map, all the data of the base drive current value $I_{DBASE}$ within this operation range corresponds to the minimum value $I_{D\_FCmin}$ shown in FIG. 5. Note that the data of the base drive current value $I_{DBASE}$ within the operation range (see the "WGV INTERMEDIATE OPENING DEGREE" range in FIG. 3) where the opening degree of the WGV is the intermediate opening degree is common to the first base opening degree map and the second base opening degree map.

Figure 6:
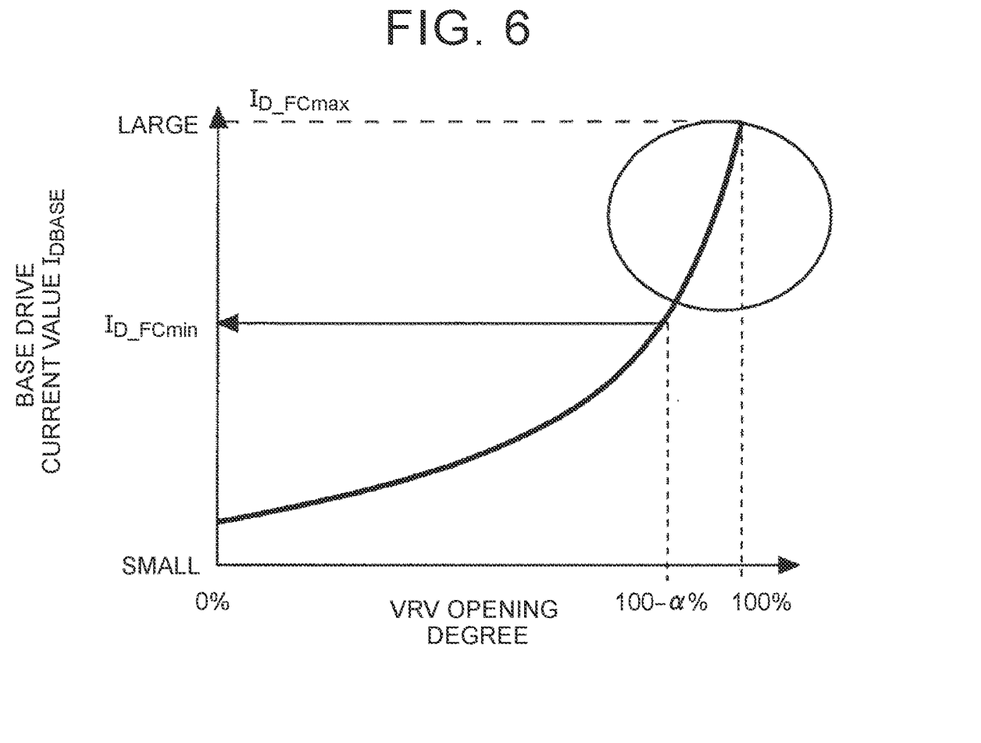
FIG. 6 is a graph illustrating a relational example between an opening degree of a VRV shown in FIG. 2 and the base drive current value.

FIG. 6 is a graph illustrating a relational example between the opening degree of the VRV 78 shown in FIG. 2 and the base drive current value $I_{DBASE}$ (where the WGV anterior-posterior differential pressure is constant). As shown in FIG. 6, when the maximum value $I_{D\_FCmax}$ is applied to the solenoid coil of the VRV 78, the opening degree of the VRV 78 can be set to 100%. When the opening degree of the VRV 78 becomes 100%, the negative pressure that acts on the low-pressure chamber 72 shown in FIG. 2 can be maintained at the maximum negative pressure. When the negative pressure that acts on the low-pressure chamber 72 can be maintained at the maximum negative pressure, the opening degree of the driven WGV can be maintained in the fully closed state without being influenced by the WGV anterior-posterior differential pressure and the like. When the minimum value $I_{D\_FCmin}$ is applied to the solenoid coil of the VRV 78, the opening degree of the VRV 78 can be set to 100–α % (<100%). When the opening degree of the VRV 78 becomes 100–α %, the negative pressure that acts on the low-pressure chamber 72 can be maintained at a value smaller than the maximum negative pressure, more specifically, a value whose absolute value is smaller than the absolute value of the maximum negative pressure (in other words, the negative pressure that acts on the low-pressure chamber 72 can be maintained at a value on the atmospheric pressure side, that is, a value that is closer to the atmospheric pressure than the maximum negative pressure is). In the case where the negative pressure that acts on the low-pressure chamber 72 can be maintained at the value closer to the atmospheric pressure, the time required for the negative pressure that acts on the low-pressure chamber 72 to reach the desired value can be shortened when the actual boost pressure is increased to be equal to or higher than the target boost pressure in the near future.

Figure 7:
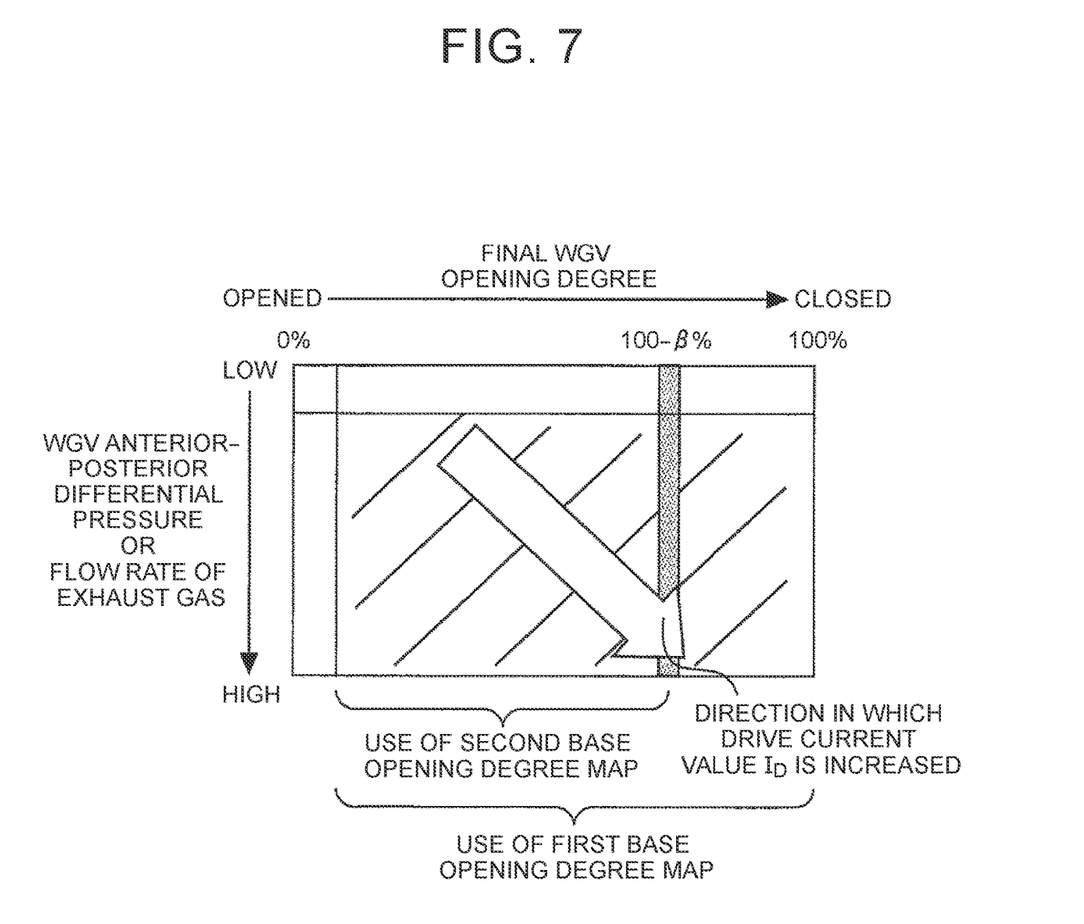
FIG. 7 is a chart illustrating a drive current value that is computed from the drive current map at a time when the base opening degree map is switched for use.

FIG. 7 is a chart illustrating a drive current value $I_D$ that is computed from the drive current map at the time when the base opening degree map is switched for use. As shown in FIG. 7, the drive current map is defined by the final opening degree of the driven WGV and the WGV anterior-posterior differential pressure (or the flow rate of the exhaust gas that flows upstream of the driven WGV). The drive current value $I_D$ in the drive current map is set to be larger as the final opening degree of the driven WGV is increased. As shown in FIG. 7, the final opening degree of the driven WGV is expressed using the opening degree of the VRV 78. That is, as the state of the driven WGV is changed from the opened state to the closed state, the final opening degree is changed from 0% to 100%. In addition, the drive current value $I_D$ in the drive current map is set to be larger as the WGV anterior-posterior differential pressure is increased. When the first base opening degree map is used, all the data on the drive current map shown in FIG. 7 serves as a candidate for the drive current value $I_D$. When the second base opening degree map is used, the data on the left side of the opening degree 100–β % shown in FIG. 7 serves as the candidate for the drive current value $I_D$. That is, when the second base opening degree map is used, the data on the right side of the opening degree 100–β % is not the candidate for the drive current value $I_D$.

As described above, according to the boost pressure feedback control in this embodiment, when the boost pressure difference is equal to or larger than the threshold, the first base opening degree map is used. Accordingly, in the case where the actual boost pressure is lower than the target boost pressure and the boost pressure difference is equal to or larger than the threshold, the negative pressure that acts on the low-pressure chamber 72 shown in FIG. 2 can be maintained at the maximum negative pressure. Thus, the opening degree of the driven WGV can be maintained in the fully closed state without being influenced by the WGV anterior-posterior differential pressure and the like. In the case where the boost pressure difference is smaller than the threshold and the actual boost pressure is lower than the target boost pressure, the second base opening degree map is used. Accordingly, in the case where the boost pressure difference is smaller than the threshold and the actual boost pressure is lower than the target boost pressure, the negative pressure that acts on the low-pressure chamber 72 can be maintained to at a value smaller than the maximum negative pressure, more specifically, a value whose absolute value smaller than the absolute value of the maximum negative pressure. Thus, the time required for the negative pressure that acts on the low-pressure chamber 72 to reach the desired value can be shortened when the actual boost pressure is increased to be equal to or higher than the target boost pressure in the near future. That is, it is possible to ensure the supercharging responsiveness at the time when the actual boost pressure is increased to be equal to or higher than the target boost pressure in the near future.

Figure 8:
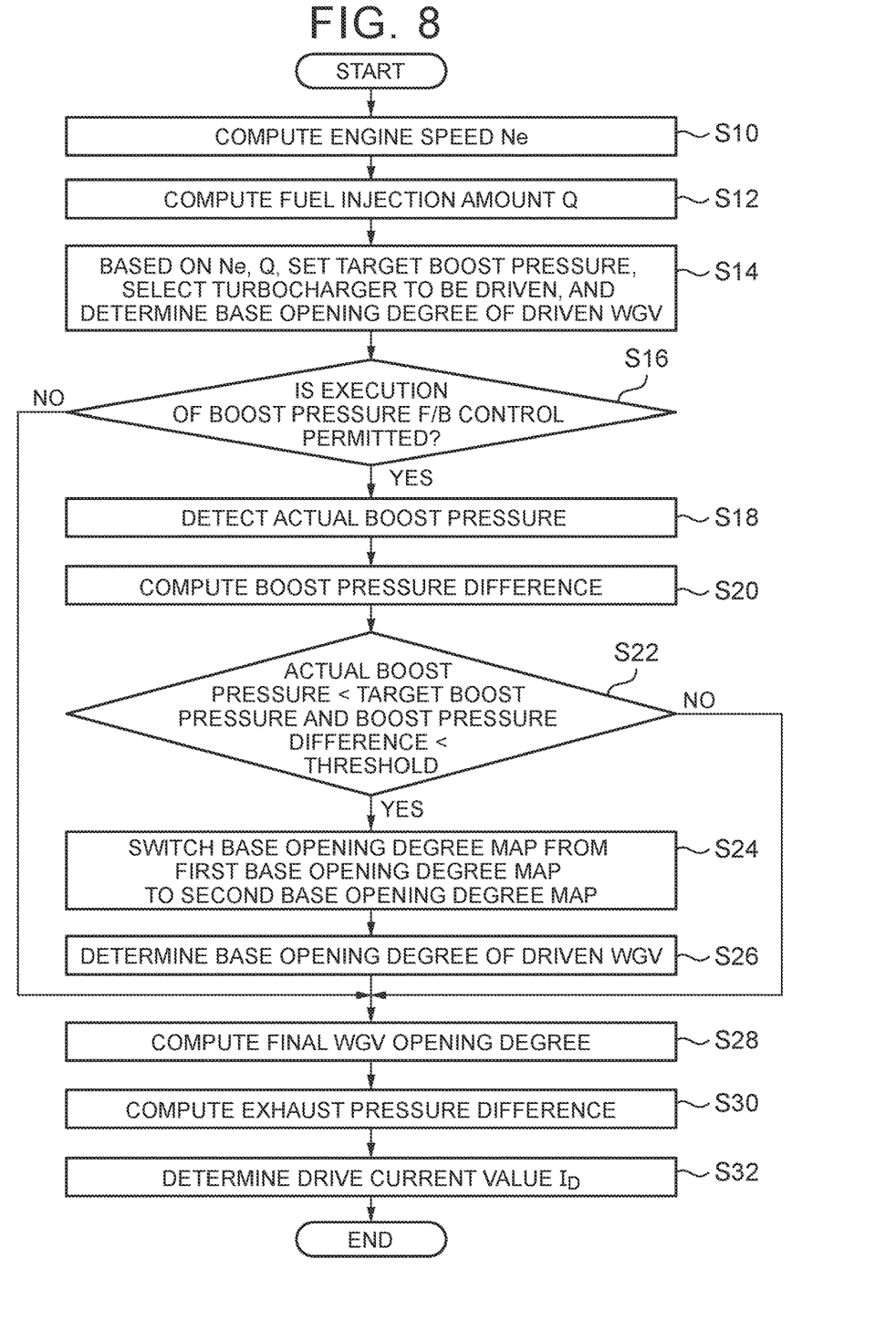
FIG. 8 is a flowchart of a processing example that is executed when an ECU shown in FIG. 1 executes boost pressure feedback control in the embodiment of the disclosure.

FIG. 8 is a flowchart of a processing example that is executed when the ECU 50 shown in FIG. 1 executes the boost pressure feedback control in the embodiment of the disclosure. Note that a routine shown in FIG. 8 is repeatedly executed in cycles of the engine 10. In addition, the first base opening degree map is set as a standard base opening degree map used by the ECU 50.

In the routine shown in FIG. 8, the ECU 50 first computes the engine speed Ne (step S10). The ECU 50 computes the engine speed Ne on the basis of the output signal of the crank angle sensor 52.

Following step S10, the ECU 50 computes the fuel injection amount Q (step S12). The ECU 50 computes the fuel injection amount Q on the basis of the output signal of the accelerator operation amount sensor 51.

Following step S12, based on the engine speed Ne and the fuel injection amount Q, the ECU 50 sets the target boost pressure, selects the turbocharger to be driven, and determines the base opening degree of the driven WGV (step S14). The ECU 50 computes the target boost pressure on the basis of the engine speed Ne and the fuel injection amount Q, which are computed in steps S10, S12, and the above-described target boost pressure map. The ECU 50 selects the turbocharger to be driven on the basis of the engine speed Ne, the fuel injection amount Q, and the above-described driven-turbocharger map. The ECU 50 determines the base opening degree of the driven WGV on the basis of the engine speed Ne, the fuel injection amount Q, and the first base opening degree map.

Following step S14, the ECU 50 determines whether the execution of the boost pressure FB control is permitted (step S16). When a determination result is negative, the ECU 50 skips processing from step S18 to step S26, and the processing proceeds to step S28. When the determination result is positive, the ECU 50 detects the actual boost pressure (step S18). The ECU 50 detects the actual boost pressure on the basis of the output signal of the boost pressure sensor 53.

Following step S18, the ECU 50 computes the boost pressure difference (step S20). The ECU 50 computes a difference between the target boost pressure computed in step S14 and the actual boost pressure detected in step S18, as the boost pressure difference.

Following step S20, the ECU 50 determines whether the actual boost pressure is lower than the target boost pressure and the boost pressure difference is smaller than the threshold (step S22). The ECU 50 determines a magnitude relationship between the target boost pressure computed in step S14 and the actual boost pressure detected in step S18. The ECU 50 also determines whether the boost pressure difference, which is computed in step S20, is smaller than the above-described threshold. When a determination result is positive, the ECU 50 switches the base opening degree map to be used from the first base opening degree map to the second base opening degree map (step S24). When the determination result is negative, the ECU 50 skips the processing in steps S24, S26, and the processing proceeds to step S28.

Following step S24, the ECU 50 determines the base opening degree of the driven WGV on the basis of the engine speed Ne, the fuel injection amount Q, and the second base opening degree map (step S26).

In step S28, the ECU 50 computes the final opening degree of the WGV. The ECU 50 computes the above-described feedback correction amount on the basis of the boost pressure difference computed in step S20. Then, the ECU 50 computes the final opening degree of the WGV on the basis of this feedback correction amount and the base opening degree determined in step S14. Alternatively, the ECU 50 computes the final opening degree of the WGV on the basis of this feedback correction amount and the base opening degree determined in step S26.

Following step S28, the ECU 50 computes the exhaust pressure difference (step S30). The ECU 50 computes the exhaust pressure difference on the basis of the output signals of the exhaust pressure sensors 55, 56 or the output signals of the exhaust pressure sensors 57, 58.

Following step S30, the ECU 50 determines the drive current value $I_D$ (step S32). The ECU 50 determines the drive current value $I_D$ on the basis of the exhaust pressure difference computed in step S30, and the drive current map.

As described above, according to the routine shown in FIG. 8, the base opening degree map can be switched between the first base opening degree map and the second base opening degree map in accordance with the determination result regarding the boost pressure difference. Accordingly, it is possible to maintain the opening degree of the driven WGV in the fully closed state at the time when the actual boost pressure is lower than the target boost pressure, and to ensure the supercharging responsiveness at the time when the actual boost pressure is increased to be equal to or higher than the target boost pressure in the near future.

Note that, in the above-described embodiment, the data of the drive current value $I_D$ indicated on the right side of the opening degree 100-β % shown in FIG. 7 corresponds to the "first drive current value" in the disclosure. In addition, the data of the drive current value $I_D$ at the opening degree 100-β % corresponds to the "second drive current value" in the disclosure. The opening degree 100-β % is regarded as the opening degree in the fully closed state. In other words, when the opening degree is 100-β %, the WGV is regarded as being in the fully closed state. The opening degree 100-β % is the opening degree that is in the fully closed state and is as close to the intermediate opening degree as possible.

As the precondition, the system in the above-described embodiment is the series twin-turbo system in which the two turbochargers 22, 24 are disposed in series. However, the above-described boost pressure FB control can be also applied to a single-turbo system that includes any one of the turbochargers 22, 24.

What is claimed is:

1. A control device for an internal combustion engine including a turbocharger and a waste gate valve, the turbocharger including a turbine driven by exhaust gas flowing through an exhaust pipe of the internal combustion engine, and a compressor connected to the turbine and configured to compress air flowing through an intake pipe of the internal combustion engine, the waste gate valve being a negative-pressure waste gate valve provided in a bypass pipe that bypasses the turbine in the exhaust pipe, and the waste gate valve being configured such that an opening degree of the waste gate valve is changed toward a fully closed state from a fully opened state when a pressure regulation valve regulates a negative pressure, the control device comprising
an electronic control unit configured i) to apply a first drive current value to the pressure regulation valve so as to maintain the opening degree of the waste gate valve in the fully closed state in a case where an actual boost pressure that is an actual pressure of the air flowing through a portion of the intake pipe downstream of the compressor is lower than a target boost pressure and a boost pressure difference between the actual boost pressure and the target boost pressure is equal to or larger than a threshold, and ii) to apply a second drive current value that is smaller than the first drive current value to the pressure regulation valve in a case where the actual boost pressure is lower than the target boost pressure and the boost pressure difference is smaller than the threshold.

2. The control device according to claim 1, wherein the second drive current value maintains the opening degree of the waste gate valve in the fully closed state in which the opening degree of the waste gate valve is as close to an intermediate opening degree as possible.

* * * * *